US011443401B2

(12) United States Patent
Beattie, Jr. et al.

(10) Patent No.: US 11,443,401 B2
(45) Date of Patent: Sep. 13, 2022

(54) DIGITAL WATERMARKING

(71) Applicant: AT&T Intellectual Property I, L.P., Atlanta, GA (US)

(72) Inventors: James Gordon Beattie, Jr., Bergenfield, NJ (US); Haywood S. Peitzer, Randolph, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 86 days.

(21) Appl. No.: 16/880,912

(22) Filed: May 21, 2020

(65) Prior Publication Data

US 2021/0366074 A1    Nov. 25, 2021

(51) Int. Cl.
  *G06K 9/00*    (2022.01)
  *G06T 1/00*    (2006.01)
  *G10L 19/018*  (2013.01)

(52) U.S. Cl.
  CPC .......... *G06T 1/0028* (2013.01); *G10L 19/018* (2013.01)

(58) Field of Classification Search
  CPC ..... G06T 1/0028; G06T 1/0021; G06T 1/005; G06T 2201/0051; G06T 2201/0065; G06T 2201/0202; G06T 2201/0061; G06T 1/0064; G06T 2201/0052; G06T 1/0092; G06T 2201/0083; G06T 2201/005; G06T 2201/0081; G06T 2207/20021; G06T 2201/0053; G06T 2201/0062; H04N 21/8358; H04N 1/32144; H04N 1/32149; H04N 1/3232; H04N 1/32352; H04N 5/232; H04N 5/272; G06F 2221/0733; G06F 3/0412; G06K 19/06103; G06K 19/06056; G06K 19/06178; H04L 2209/608; H04L 2209/38; H04L 2209/56; G10L 19/018
  See application file for complete search history.

(56) References Cited

U.S. PATENT DOCUMENTS

| | | | | |
|---|---|---|---|---|
| 5,832,119 A * | 11/1998 | Rhoads | ............... | G06Q 20/341 |
| | | | | 382/232 |
| 5,960,081 A * | 9/1999 | Vynne | ............... | H04N 21/23892 |
| | | | | 713/176 |
| 6,411,725 B1 * | 6/2002 | Rhoads | ................ | G10L 19/018 |
| | | | | 382/100 |
| 6,449,379 B1 * | 9/2002 | Rhoads | ................ | H04N 5/913 |
| | | | | 382/100 |
| 7,188,186 B1 * | 3/2007 | Meyer | ............... | H04N 1/32144 |
| | | | | 709/231 |
| 8,054,969 B2 * | 11/2011 | Adhikari | ............... | H04L 63/168 |
| | | | | 713/181 |
| 8,990,844 B2 * | 3/2015 | Oh | ....................... | G06T 1/0085 |
| | | | | 725/19 |
| 9,179,033 B2 * | 11/2015 | Reed | ................ | H04N 1/32208 |

(Continued)

*Primary Examiner* — Shervin K Nakhjavan (57) ABSTRACT

In one example, a method for inserting a digital watermark in a signal includes obtaining the signal comprising a plurality of frames, inserting a first digital watermark in a first frame of the plurality of frames, inserting a second digital watermark in a second frame of the plurality of frames, wherein the second digital watermark differs from the first digital watermark in at least one way selected from a group of: a location within a respective frame, a number of bits, a pattern of bits, and a number of bits of a noise, and outputting a watermarked signal including the first digital watermark in the first frame and the second digital watermark in the second frame.

20 Claims, 4 Drawing Sheets

(56) References Cited

U.S. PATENT DOCUMENTS

| | | | | |
|---|---|---|---|---|
| 9,208,534 | B2* | 12/2015 | Cain | H04N 19/467 |
| 2002/0186863 | A1* | 12/2002 | Rhoads | G07F 7/12 |
| | | | | 704/E19.009 |
| 2004/0125125 | A1* | 7/2004 | Levy | H04N 21/8355 |
| | | | | 715/716 |
| 2005/0123169 | A1* | 6/2005 | Wendt | G06T 1/0064 |
| | | | | 382/100 |
| 2005/0159831 | A1* | 7/2005 | Gopalan | G10L 19/018 |
| | | | | 700/94 |
| 2006/0140441 | A1* | 6/2006 | Miller | G06T 1/0092 |
| | | | | 713/176 |
| 2007/0136597 | A1* | 6/2007 | Levy | G06T 1/005 |
| | | | | 713/176 |
| 2008/0056529 | A1* | 3/2008 | Bhattacharjya | H04N 1/32208 |
| | | | | 382/100 |
| 2009/0228592 | A1* | 9/2009 | Snyder | H04N 1/32219 |
| | | | | 709/226 |
| 2010/0228632 | A1* | 9/2010 | Rodriguez | G06T 3/0006 |
| | | | | 705/14.66 |
| 2011/0007935 | A1* | 1/2011 | Reed | G06T 1/0028 |
| | | | | 382/165 |
| 2011/0019870 | A1* | 1/2011 | Ballocca | H04N 19/467 |
| | | | | 382/100 |
| 2011/0129116 | A1* | 6/2011 | Thorwirth | H04N 19/467 |
| | | | | 382/100 |
| 2014/0047475 | A1* | 2/2014 | Oh | H04N 21/8586 |
| | | | | 725/40 |
| 2014/0325205 | A1* | 10/2014 | Carlson | H04L 63/0428 |
| | | | | 713/150 |
| 2017/0061563 | A1* | 3/2017 | Falkenstern | C09D 11/037 |
| 2020/0027187 | A1* | 1/2020 | Giladi | G06T 1/0085 |

* cited by examiner

DIGITAL WATERMARKING

The present disclosure relates generally to data security, and relates more particularly to devices, non-transitory computer-readable media, and methods for digital watermarking.

BACKGROUND

Digital watermarks comprise specific types of markers that may be embedded in noise tolerant signals such as image, video, audio, or other signals (generally "media signals"). The markers typically hide information in carrier signals that carry the media signals. Thus, digital watermarks are commonly used to protect streaming media against unauthorized use and/or to verify the authenticity of the streaming media to users. As an example, multiple "screener" copies of a film that has been nominated for an award may be distributed to voters who will vote on the award, and each screener copy may bear a different, unique digital watermark. Thus, if an unauthorized party comes into possession of a screener copy, the screener copy can be traced back to the original party to whom the screener copy was provided based on the unique digital watermark, allowing the owners of the film to easily identify any points of compromise in the chain of distribution.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

The present disclosure broadly discloses methods, computer-readable media, and systems for inserting a digital watermark in a stream of data. In one example, a method for inserting a digital watermark in a signal includes obtaining the signal comprising a plurality of frames, inserting a first digital watermark in a first frame of the plurality of frames, inserting a second digital watermark in a second frame of the plurality of frames, wherein the second digital watermark differs from the first digital watermark in at least one way selected from a group of: a location within a respective frame, a number of bits, a pattern of bits, and a number of bits of a noise, and outputting a watermarked signal including the first digital watermark in the first frame and the second digital watermark in the second frame.

In another example, a non-transitory computer-readable medium may store instructions which, when executed by a processing system in a communications network, cause the processing system to perform operations. The operations may include obtaining the signal comprising a plurality of frames, inserting a first digital watermark in a first frame of the plurality of frames, inserting a second digital watermark in a second frame of the plurality of frames, wherein the second digital watermark differs from the first digital watermark in at least one way selected from a group of: a location within a respective frame, a number of bits, a pattern of bits, and a number of bits of a noise, and outputting a watermarked signal including the first digital watermark in the first frame and the second digital watermark in the second frame.

In another example, a device may include a processing system including at least one processor and a non-transitory computer-readable medium storing instructions which, when executed by the processing system when deployed in a communications network, cause the processing system to perform operations. The operations may include obtaining the signal comprising a plurality of frames, inserting a first digital watermark in a first frame of the plurality of frames, inserting a second digital watermark in a second frame of the plurality of frames, wherein the second digital watermark differs from the first digital watermark in at least one way selected from a group of: a location within a respective frame, a number of bits, a pattern of bits, and a number of bits of a noise, and outputting a watermarked signal including the first digital watermark in the first frame and the second digital watermark in the second frame.

As discussed above, digital watermarks comprise specific types of markers that may be embedded in noise tolerant signals such as image, video, audio, or other signals (generally "media signals"). The markers typically hide information in carrier signals that carry the media signals. Thus, digital watermarks are commonly used to protect streaming media against unauthorized use and/or to verify the authenticity of the streaming media to users. Unfortunately, conventional digital watermarks tend to be obvious and intrusive, especially in video media. The presence of a digital watermark may therefore be distracting from a user perspective (e.g., a viewer of watermarked film) and may undesirably compromise the artistic integrity of the watermarked media from a creator perspective (e.g., a director of a watermarked film).

Moreover, even when the digital watermark is relatively unobtrusive, the digital watermark may still fail to protect the watermarked media and/or the users of the watermarked media. For instance, many digital watermarks can be easily replicated or even washed out of a media stream when the media stream is transmitted and presented without proper authorization. In addition, a party receiving a watermarked media may be unable to leverage the watermark as proof that the watermarked media has not been tampered with, due to a functional gap in software and/or in a reference data transfer. The inability to verify that the watermarked media has not been tampered with may leave the receiving party vulnerable to software and other attacks.

Examples of the present disclosure provide a plurality of watermark concealment techniques that can be used in various permutations to conceal a digital watermark in a media. In one example, each of the watermark concealment techniques involves varying some dimensional characteristic of a signal containing the media over time. For instance, the location of the digital watermark within a frame of the signal, the number of bits of the digital watermark, the pattern of bits in the digital watermark, and/or the number of bits of a noise obfuscating the digital watermark may be varied over time in the signal (e.g., varied from one frame of the signal to another frame of the signal). Employing a combination of these concealment techniques may help to ensure that the digital watermark is difficult to detect (and, therefore, remove from the signal). For instance, the greater the number of concealment techniques that are employed (e.g., the greater the number of dimensional characteristics of the signal that are varied over time), the harder it will be to detect every instance of the digital watermark in the signal. In further examples, the digital watermark may be encrypted to further guard against removal of the digital watermark from the signal.

A digital watermark of the present disclosure may be used in any of the manners that a conventional digital watermark may be used, including copyright protection, source tracking, broadcast monitoring, video and/or audio authentication, fraud detection, identification card security, social network content management, and other applications. These and other aspects of the present disclosure are discussed in greater detail below in connection with the examples of FIGS. 1-4.

Figure 1:
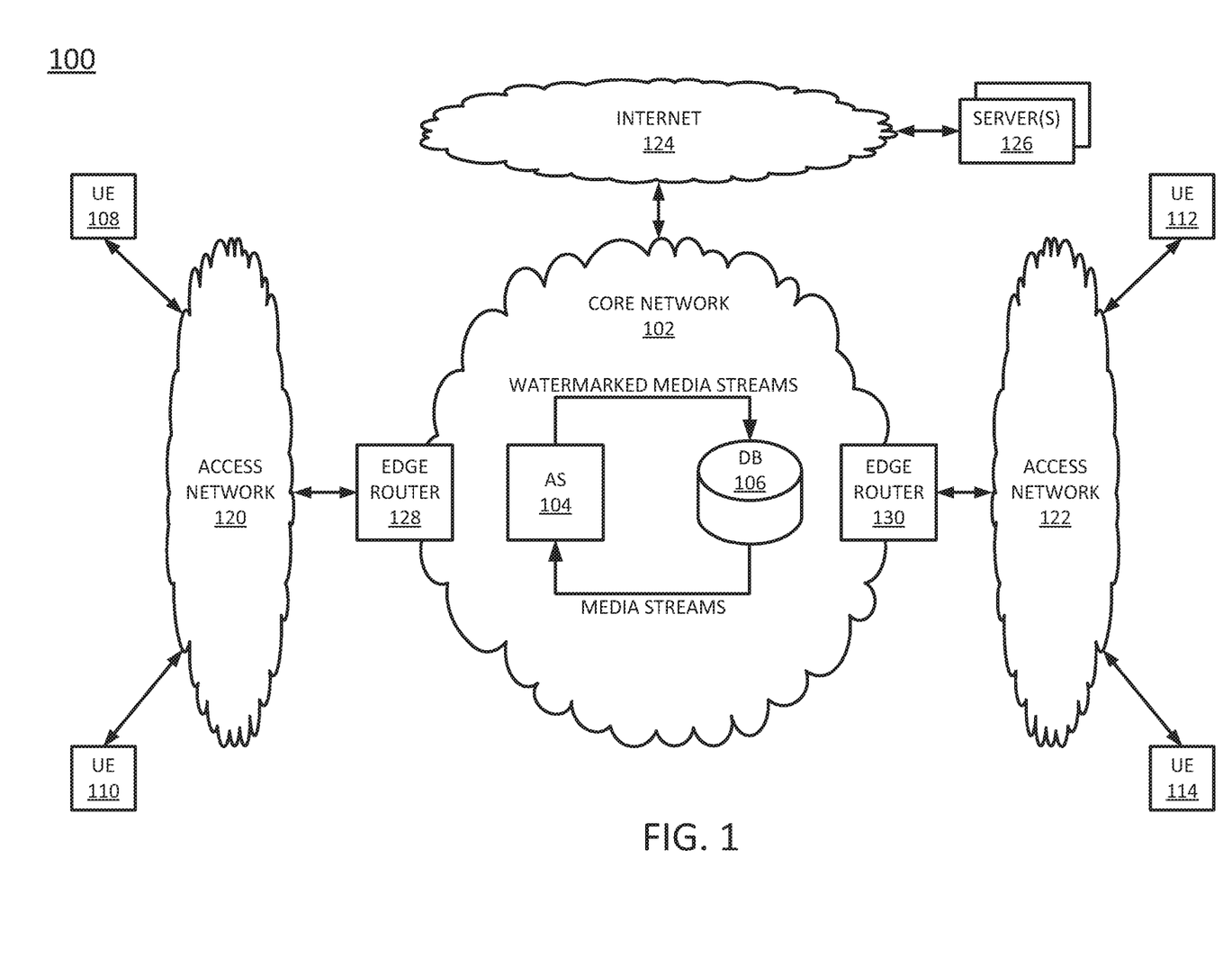
FIG. 1 illustrates an example system in which examples of the present disclosure for digital watermarking may operate.

To further aid in understanding the present disclosure, FIG. 1 illustrates an example system 100 in which examples of the present disclosure for digital watermarking may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VoIP) networks, Service over IP (SoIP) networks, the World Wide Web, and the like.

In one example, the system 100 may comprise a core network 102. The core network 102 may be in communication with one or more access networks 120 and 122, and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. In one example, the core network 102 may include at least one application server (AS) 104, at least one database (DB) 106, and a plurality of edge routers 128-130. For ease of illustration, various additional elements of the core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, $3^{rd}$ party networks, and the like. For example, the operator of the core network 102 may provide a cable television service, an IPTV service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider (e.g., an Internet service provider, or a service provider who provides Internet services in addition to other telecommunication services). The core network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access network 120 may be in communication with one or more user endpoint devices 108 and 110. Similarly, the access network 122 may be in communication with one or more user endpoint devices 112 and 114. The access networks 120 and 122 may transmit and receive communications between the user endpoint devices 108, 110, 112, and 114, between the user endpoint devices 108, 110, 112, and 114, the server(s) 126, the AS 104, other components of the core network 102, devices reachable via the Internet in general, and so forth. In one example, each of the user endpoint devices 108, 110, 112, and 114 may comprise any single device or combination of devices that may comprise a user endpoint device. For example, the user endpoint devices 108, 110, 112, and 114 may each comprise a mobile device, a cellular smart phone, a gaming console, a set top box, a laptop computer, a tablet computer, a desktop computer, an application server, a bank or cluster of such devices, and the like.

In one example, one or more servers 126 may be accessible to user endpoint devices 108, 110, 112, and 114 via Internet 124 in general. The server(s) 126 may be associated with Internet content providers, e.g., entities that provide content (e.g., new, blogs, videos, music, files, or the like) in the form of websites to users over the Internet 124. Thus, some of the servers 126 may comprise content servers, e.g., servers that store content such as images, text, video, and the like which may be served to web browser applications executing on the user endpoint devices 108, 110, 112, and 114 in the form of websites.

Figure 4:
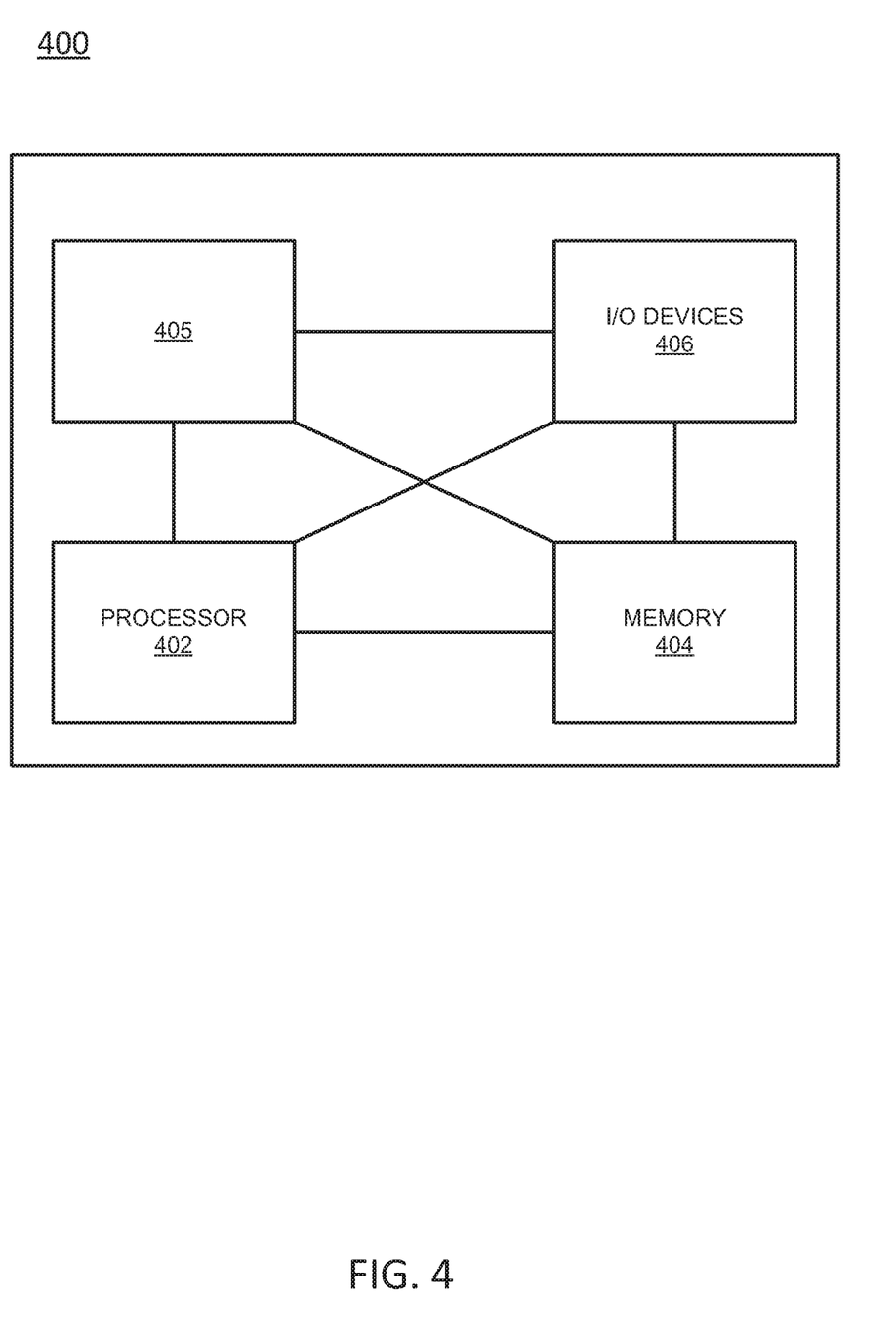
FIG. 4 illustrates an example of a computing device, or computing system, specifically programmed to perform the steps, functions, blocks, and/or operations described herein.

In accordance with the present disclosure, the AS 104 may be configured to provide one or more operations or functions in connection with examples of the present disclosure for digital watermarking, as described herein. The AS 104 may comprise one or more physical devices, e.g., one or more computing systems or servers, such as computing system 400 depicted in FIG. 4, and may be configured as described below to insert digital watermarks into media streams. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

In one example, the AS 104 may be configured to retrieve media streams from a storage device, such as the database (DB) 106. For instance, in one example, the media streams may include video streams (e.g., films, television shows, sports broadcasts, music videos, or the like), audio streams (e.g., songs, podcasts, audio books, or the like), text streams (e.g., electronic books, legal documents, manuscript drafts, or the like), sequences of images (e.g., slide shows, web sites, or the like), three-dimensional models (e.g., models of buildings in a 5G build-out area, terrain maps, models for use in extended reality media, or the like), holographic images, software updates, reference data updates, and/or other type types of media streams.

In one example, the AS 104 may apply one or more concealment techniques that vary some dimensional characteristic of a media stream being watermarked over time. For instance, the AS 104 may vary the location of the digital watermark within a frame of the media stream, the number of bits of the digital watermark, the pattern of bits in the digital watermark, and/or the number of bits of a noise obfuscating the digital watermark over time in the media stream (e.g., varied from one frame of the media stream to another frame of the media stream). A combination of these concealment techniques may help to ensure that the digital watermark is difficult to detect (and, therefore, remove from the media stream). For instance, the greater the number of concealment techniques that are employed (e.g., the greater the number of dimensional characteristics of the media stream that are varied over time), the harder it will be to detect every instance of the digital watermark in the signal. In further examples, the digital watermark may be encrypted to further guard against removal of the digital watermark from the media stream. One specific example of a method for inserting digital watermarks into media streams is described in greater detail in connection with FIG. 2.

In one example, the AS 104 may output watermarked media streams to the DB 106. Thus, the DB 106 may store media streams both before the media streams are watermarked and after the media streams are watermarked. In one example, the DB 106 may comprise a physical storage device integrated with the AS 104 (e.g., a database server or a file server), or attached or coupled to the AS 104, in accordance with the present disclosure. In one example, the AS 104 may load instructions into a memory, or one or more distributed memory units, and execute the instructions for watermarking media streams, as described herein.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For example, the system 100 may include other network elements (not shown) such as border elements, routers, switches, policy servers, security devices, gateways, a content distribution network (CDN) and the like. For example, portions of the core network 102, access networks 120 and 122, and/or Internet 124 may comprise a content distribution network (CDN) having ingest servers, edge servers, and the like. Similarly, although only two access networks, 120 and 122 are shown, in other examples, access networks 120 and/or 122 may each comprise a plurality of different access networks that may interface with the core network 102 independently or in a chained manner. For example, UE devices 108, 110, 112, and 114 may communicate with the core network 102 via different access networks, user endpoint devices 110 and 112 may communicate with the core network 102 via different access networks, and so forth. Thus, these and other modifications are all contemplated within the scope of the present disclosure.

Figure 2:
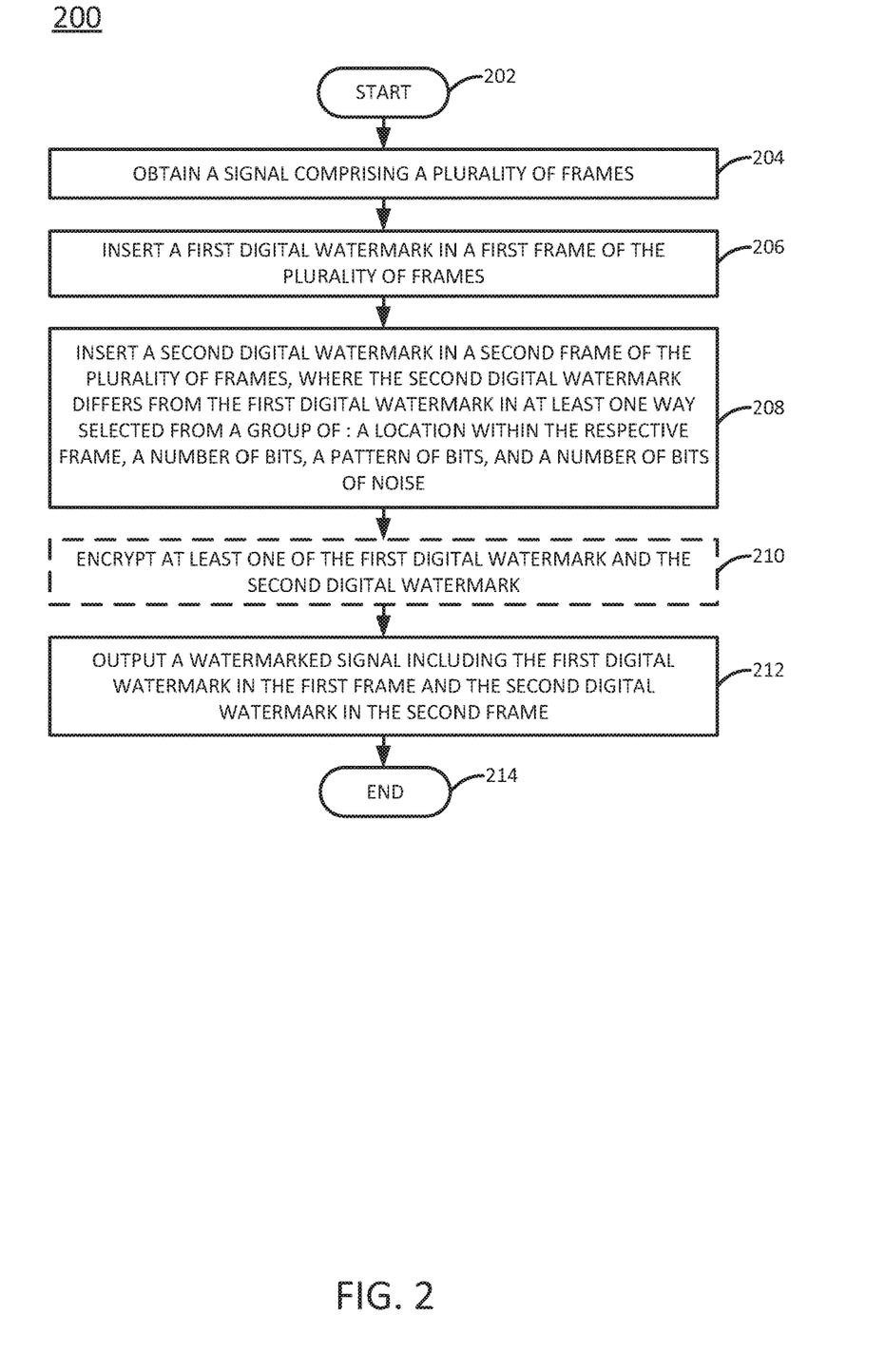
FIG. 2 illustrates a flowchart of an example method for inserting a digital watermark in a stream of data, in accordance with the present disclosure.

FIG. 2 illustrates a flowchart of an example method 200 for inserting a digital watermark in a stream of data, in accordance with the present disclosure. In one example, steps, functions and/or operations of the method 200 may be performed by a device as illustrated in FIG. 1, e.g., AS 104 or any one or more components thereof. In one example, the steps, functions, or operations of method 200 may be performed by a computing device or system 400, and/or a processing system 402 as described in connection with FIG. 4 below. For instance, the computing device 400 may represent at least a portion of the AS 104 in accordance with the present disclosure. For illustrative purposes, the method 200 is described in greater detail below in connection with an example performed by a processing system, such as processing system 402.

The method 200 begins in step 202 and proceeds to step 204. In step 204, the processing system may obtain a signal comprising a plurality of frames. The signal may comprise a stream of data that is to be secured with a digital watermark. For instance, in one example, the stream of data may comprise a video stream, where each frame of the plurality frames comprises an individual video frame. In another example, the stream of data may comprise an audio stream, where each frame of the plurality of frames comprises an individual audio frame. In further examples, the stream of data may comprise a stream of text, a sequence of images, a three-dimensional model, a software update, a reference data update, or another type of data. In one example, the stream of data may be retrieved from a database that stores a plurality of streams of data. In another example, the stream of data may be uploaded directly to the processing system.

In step 206, the processing system may insert a first digital watermark in a first frame of the plurality of frames. In one example, the first digital watermark may comprise data that is inserted into the visual data of the first frame. For instance, the first digital watermark may comprise a pattern of bits that is inserted into the image portion of a video frame. In another example, the first digital watermark may comprise data that is inserted into the audio data of the first frame. For instance, the first digital watermark may comprise a pattern of bits that is inserted into the audio portion of the first frame.

In step 208, the processing system may insert a second digital watermark in a second frame of the plurality of frames, where the second digital watermark differs from the first digital watermark in at least one way selected from a group of: a location within the respective frame, a number of bits, a pattern of bits, and a number of bits of a noise. In one example, the second digital watermark may comprise data that is inserted into the visual data of the second frame. In another example, the second digital watermark may comprise data that is inserted into the audio data of the second frame.

In one example, the first frame and the second frame may comprise consecutive frames (e.g., the second frame may occur immediately after the first frame when the plurality of frames is played in sequence). However, in another example, the first frame and the second frame comprise nonconsecutive frames.

For instance, in one example, the location of the first digital watermark within the first frame may differ from the location of the second digital watermark within the second frame. As an example, the first digital watermark may be located in the bottom left corner of the first frame, while the second digital watermark may be located in the top right corner of the second frame. In one example, the locations within the first frame and the second frame may be defined by pixel position (e.g., where the first frame and the second frame contain an equal number of pixels arranged in the same dimensions).

In one example, the number of bits of the first digital watermark may differ from the number of bits of the second digital watermark. For instance, the first digital watermark may comprise a pattern of n bits, while the second digital watermark may comprise a pattern of at least n+1 bits.

In one example, the pattern of the bits in the first digital watermark may differ from the pattern of the bits in the second digital watermark. For instance, the pattern of the bits in the first digital watermark may take on a first shape and/or color, while the pattern of bits in the second digital watermark may take on a second shape and/or color that is different from the first shape and/or color. As an example, if the stream of data is a video, and the first and second frames comprise first and second video frames depicting a person, the color of the person's eyes could be varied as a watermark (e.g., such that the person's eyes are brown in the first frame but green in the second frame).

In one example, a number of bits of a noise (broadly an image noise such as random variation of brightness and/or color information in the frame) obfuscating the first digital watermark in the first frame may differ from a number of bits of a noise obfuscating the second digital watermark in the second frame. That is, a certain number of bits of noise may be introduced into a frame in a region of a digital watermark in order to help the digital watermark "blend" into the frame. For example, such noise can be achieved by quantizing one or more pixels of an image to a number of discrete levels as desired, but other noise generating techniques can be used such as Gaussian noise generation, random valued impulse noise generation and the like.

Thus, the processing system may watermark the signal by varying at least one dimensional characteristic of the signal over time (e.g., over at least some frames of the plurality of frames). In one example, the greater the number of concealment techniques that are employed (e.g., the greater the number of dimensional characteristics of the signal that are varied over time), the harder it will be to detect every instance of the digital watermark in the signal. For instance, even if the first digital watermark is detected in the first frame, the variation of the dimensional characteristic(s) may ensure that the second digital watermark cannot be detected in the second frame based on the knowledge of the first digital watermark alone.

In one example, the dimensional characteristic(s) that is varied is user defined. However, in another example, the dimensional characteristic(s) that is varied is selected by the processing system. For instance, the processing system may select a dimensional characteristic or a combination of dimensional characteristics that is a good candidate for variation. Good candidates may be identified based on image processing techniques, audio processing techniques, optical character recognition techniques, and other types of techniques that may analyze specific types of data. For instance, varying a location of a digital watermark may be more effective in frames of video data than in frames of audio data. Moreover, the content of the frames may also affect which dimensional characteristics are best suited for variation for the purposes of digital watermarking. For instance, a digital watermark whose pattern of bits varies over several frames of video data may be harder to detect when the video data comprises a relatively fast moving or visually dense scene (e.g., a car chase, a fight scene, an explosion, etc.). However, when the video data comprises a relatively slow moving or visually simple scene (e.g., a close-up on a character presenting a monologue), the same digital watermark may be easier to detect. Thus, in the example of the relatively slow moving or visually simple scene, a different or additional dimensional characteristic may be varied to make the digital watermark harder to detect, or these scenes may even be free of watermarks to avoid having the watermarks being detected in such relatively slow moving or visually simple scenes.

In another example, rather than define the specific dimensional characteristics to be varied, a user may instead define a desired strength of the digital watermark (e.g., where the stronger the digital watermark is, the more difficult the digital watermark is to detect). For instance, the strength of a digital watermark may be defined according a numerical scale (e.g., one to ten, with one being the weakest and ten being the strongest) or some other rubrics (e.g., easy (e.g., using one of five available watermarking techniques), medium (e.g., using three of five available watermarking techniques), and difficult (e.g., using all five available watermarking techniques)). Based on the user selection, the processing system may select an optimal concealment technique or combination of concealment techniques to produce a watermark of the desired strength.

In optional step 210 (illustrated in phantom), at least one of the first digital watermark and the second digital watermark may be encrypted. For instance, the first digital watermark and/or the second digital watermark may be encrypted with at least one encryption scheme selected from the group of: a static encryption key and algorithm, a complex blockchain algorithm, and a one-time pad. Within the context of the present disclosure, a "one-time pad" may be understood to refer to a sequence of encryption keys and/or access codes which may be used sequentially or in some defined order. The same encryption keys and/or access codes cannot be used again in the same order, hence why the technique is referred to as a "one-time" pad.

In step 212, the processing system may output a watermarked signal including the first digital watermark in the first frame and the second digital watermark in the second frame. For instance, the watermarked signal may be output to a database for storage, to a user endpoint device for playback, or to another location.

The method 200 may end in step 214.

The method 200 may be implemented in any one or more of a number of ways in practice. For instance, method 200 could be used to insert a watermark into only one frame of a signal, into every frame of a signal, or into any number of frames between one and all frames of the signal. For instance, the method 200 could be used to insert digital watermarks into a subset of frames (e.g., fewer than all frames) of a signal, where the frames in the subset may be selected randomly, periodically (e.g., every x frames), or according to some quality or complexity of the frames (e.g., the visual data in some frames may provide for better concealment of the digital watermarks than the visual data in other frames). Thus, the signal may include at least one frame (e.g., a third frame or more frames) that is free of watermarks.

For instance, a single digital watermark may comprise a particular pattern of bits. The pattern of bits may be broken into a plurality of pieces, and the plurality of pieces may be distributed over a plurality of frames of a signal (where the plurality of frames need not necessarily be consecutive frames in the signal). Thus, each frame of the plurality of frames may contain a different piece of the plurality of pieces of the digital watermark.

In another example, a digital watermark may comprise an entire frame of a signal (e.g., the first digital watermark may comprise the entirety of the first frame). For instance, the frame comprising the digital watermark may be inserted between two original frames of the signal (where the two original frames may be unaltered or not directly watermarked).

In further examples, a digital watermark may be content-driven (e.g., integrated into the content of the frame being watermarked). For instance, as discussed above, a digital watermark may comprise changing an eye color of a person depicted in a video signal, in one or more frames of the video signal.

Furthermore, the digital watermark need not necessarily comprise a visual watermark or include a visual component. That is, for a content-driven digital watermark, any characteristic of the content of the signal may be a potential carrier for the digital watermark. For instance, the audio track of an audiovisual signal may carry a digital watermark, where the digital watermark may comprise one or more keywords or sound.

It should be noted that the method 200 may be expanded to include additional steps or may be modified to include additional operations with respect to the steps outlined above. In addition, although not specifically specified, one or more steps, functions, or operations of the method 200 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 2 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

Figure 3:
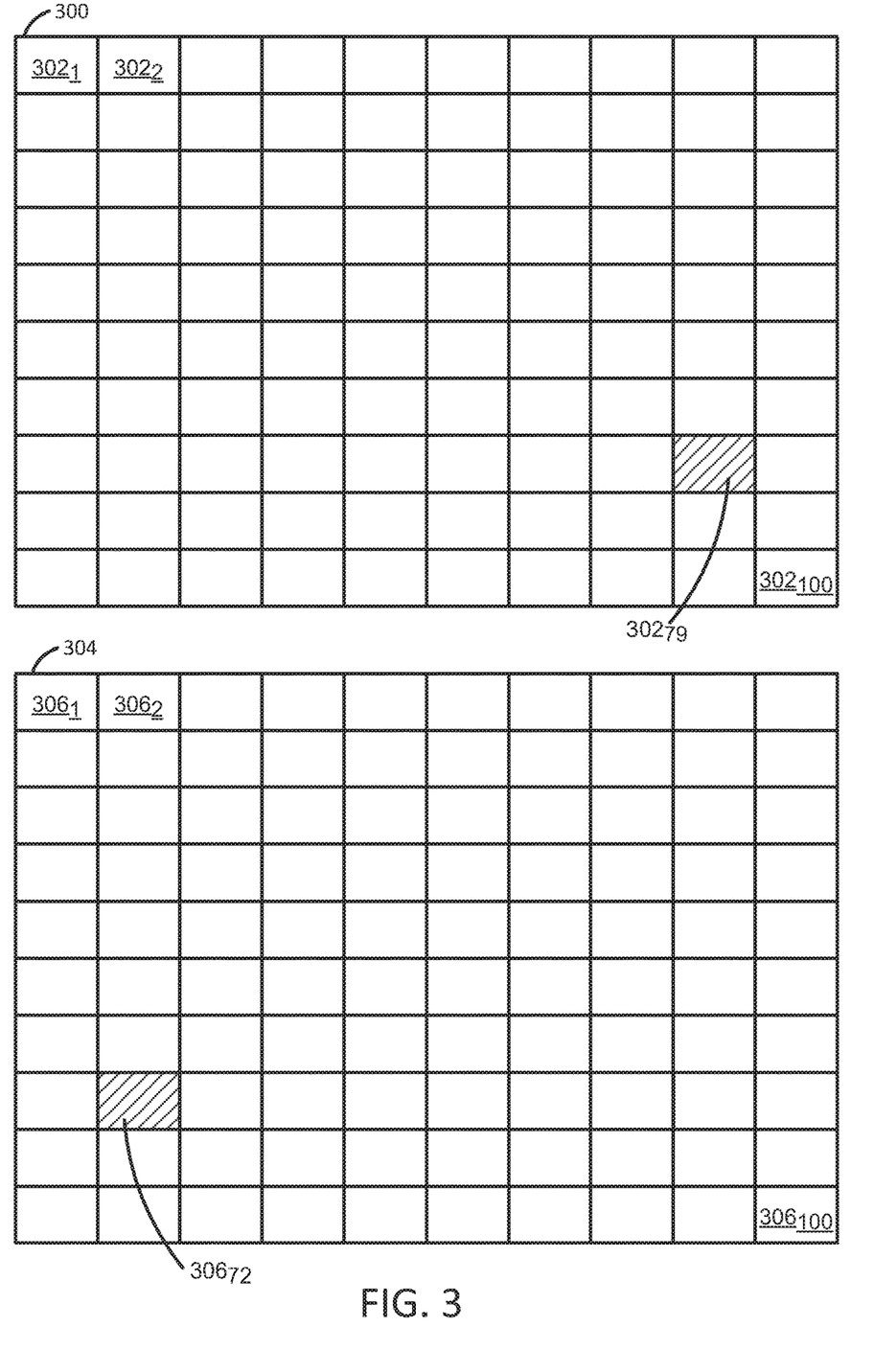
FIG. 3 illustrates one example of a digital watermark that changes location from one frame to another frame within a signal.

FIG. 3 illustrates one example of a digital watermark that changes location from one frame to another frame within a signal. For instance, an example signal may include a first frame 300 and a second frame 304, which may or may not be consecutive (e.g., the second frame 304 may or may not occur immediately after the first frame 300). In one example, each of the first frame 300 and the second frame 304 may comprise the same number of pixels. For the sake of example, each of the first frame 300 and the second frame 304 is illustrated as comprising one hundred pixels arranged in ten rows and ten columns. For instance, the first frame 300 includes pixels $302_1$-$302_{100}$, while the second frame includes pixels $306_1$-$306_{100}$.

In one example, the first frame 300 includes a digital watermark (shown as a shaded pixel) at pixel $302_{79}$, while the second frame 304 includes a digital watermark (again shown as a shaded pixel) at pixel $306_{72}$. The digital watermark in the first frame 300 may be identical to the digital watermark in the second frame 304; that is, the only difference between the digital watermarks in the first and second frames 300 and 304 may be the locations of the digital watermarks within the respective frames. However, in other examples, other dimensional characteristics of the digital watermarks (e.g., colors, patterns of bits, numbers of bits of noise, etc.) may also be varied to make detection of both digital watermarks more difficult.

Thus, according to the example of FIG. 3, the pixel position of the digital watermark may represent a numeric value. This approach may scale well for higher resolution videos (which include greater numbers of bits per frame). In another example, the numeric value may correspond to a color (e.g., a red green blue color value) of the pixel.

FIG. 4 depicts a high-level block diagram of a computing device or processing system specifically programmed to perform the functions described herein. As depicted in FIG. 4, the processing system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for inserting a digital watermark in a stream of data, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200 or the entire method 200 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one example, instructions and data for the present module or process 405 for inserting a digital watermark in a stream of data (e.g., a software program comprising computer-executable instructions) can be loaded into memory 404 and executed by hardware processor element 402 to implement the steps, functions, or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for inserting a digital watermark in a stream of data (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
   obtaining, by a processing system including at least one processor, a signal containing a media;
   inserting, by the processing system, a first digital watermark in a first frame of the media;
   inserting, by the processing system, a second digital watermark in a second frame of the media, wherein the second digital watermark differs from the first digital watermark in at least one way comprising at least one of: a number of bits of a noise, wherein the noise obfuscates the first digital watermark in the first frame and the second digital watermark in the second frame; and
   outputting, by the processing system, a watermarked signal containing the media including the first digital watermark in the first frame and the second digital watermark in the second frame.

2. The method of claim 1, wherein the media comprises a video media comprising a plurality of video frames including the first frame and the second frame.

3. The method of claim 1, wherein the media comprises an audio media comprising a plurality of audio frames including the first frame and the second frame.

4. The method of claim 1, wherein the media comprises an image media comprising a plurality of image frames including the first frame and the second frame.

5. The method of claim 1, wherein the first frame and the second frame comprise consecutive frames of a plurality of frames of the media.

6. The method of claim 1, wherein the first frame and the second frame comprise nonconsecutive frames of a plurality of frames of the media.

7. The method of claim 1, wherein the second digital watermark further differs from the first digital watermark in a pattern of bits, wherein the pattern of bits in the first digital watermark takes on a first shape, and the pattern of bits in the second digital watermark takes on a second shape that is different from the first shape.

8. The method of claim 1, wherein the second digital watermark further differs from the first digital watermark in a pattern of bits, wherein the pattern of bits in the first digital watermark takes on a first color, and the pattern of bits in the second digital watermark takes on a second color that is different from the first color.

9. The method of claim 1, further comprising, prior to the outputting:
   encrypting, by the processing system, at least one of: the first digital watermark or the second digital watermark.

10. The method of claim 9, wherein the encrypting utilizes at least one of: a static encryption key and algorithm, a complex blockchain algorithm, or a one-time pad.

11. The method of claim 1, wherein a third frame of the media is free of watermarks.

12. The method of claim 1, wherein the second digital watermark further differs from the first digital watermark in a pattern of bits, wherein the pattern of bits is broken into a plurality of pieces, wherein a first piece of the plurality of pieces is inserted into the first frame as the first digital watermark and a second piece of the plurality of pieces is inserted into the second frame as the second digital watermark.

13. The method of claim 1, wherein the first digital watermark comprised an entirety of the first frame.

14. The method of claim 1, wherein the first digital watermark is inserted into visual data of the first frame and the second digital watermark is inserted into visual data of the second frame.

15. The method of claim 1, wherein the first digital watermark is inserted into audio data of the first frame and the second digital watermark is inserted into audio data of the second frame.

16. The method of claim 1, wherein the first frame and the second frame are randomly selected from among a plurality of frames of the media for insertion of the first digital watermark and the second digital watermark, respectively.

17. The method of claim 1, wherein the first digital watermark and the second digital watermark each comprise one piece of a larger digital watermark that has been broken into a plurality of pieces, wherein the plurality of pieces is distributed over a plurality of frames of the media including the first frame and the second frame.

18. A non-transitory computer-readable medium storing instructions which, when executed by a processing system including at least one processor, cause the processing system to perform operations, the operations comprising:
   obtaining a signal containing a media;
   inserting a first digital watermark in a first frame of the media;
   inserting a second digital watermark in a second frame of the media, wherein the second digital watermark differs from the first digital watermark in at least one way comprising at least one of: a number of bits of a noise, wherein the noise obfuscates the first digital watermark in the first frame and the second digital watermark in the second frame; and outputting a watermarked signal containing the media including the first digital watermark in the first frame and the second digital watermark in the second frame.

19. The non-transitory computer-readable medium of claim 18, wherein the first frame and the second frame are randomly selected from among a plurality of frames of the media for insertion of the first digital watermark and the second digital watermark, respectively.

20. A device comprising:

a processing system including at least one processor; and a non-transitory computer-readable medium storing instructions which, when executed by the processing system, cause the processing system to perform operations, the operations comprising:

obtaining a signal containing a media;

inserting a first digital watermark in a first frame of the media;

inserting a second digital watermark in a second frame of the media, wherein the second digital watermark differs from the first digital watermark in at least one way comprising at least one of: a number of bits of a noise, wherein the noise obfuscates the first digital watermark in the first frame and the second digital watermark in the second frame; and outputting a watermarked signal containing the media including the first digital watermark in the first frame and the second digital watermark in the second frame.

* * * * *